United States Patent
Ramirez Llanos et al.

(10) Patent No.: US 12,315,194 B2
(45) Date of Patent: May 27, 2025

(54) LONG-TERM VISUAL TRAILER TRACKER FOR VEHICLE-TRAILER ANGLE ESTIMATION

(71) Applicant: Continental Autonomous Mobility US, LLC, Auburn Hills, MI (US)

(72) Inventors: Eduardo Jose Ramirez Llanos, Rochester, MI (US); Julien Ip, Royal Oak, MI (US); Victor Manuel Camacho Ruiz, Queretaro (MX)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 292 days.

(21) Appl. No.: 18/007,393

(22) PCT Filed: Jul. 29, 2021

(86) PCT No.: PCT/US2021/071051
§ 371 (c)(1),
(2) Date: Jan. 30, 2023

(87) PCT Pub. No.: WO2022/027061
PCT Pub. Date: Feb. 3, 2022

(65) Prior Publication Data
US 2023/0290001 A1     Sep. 14, 2023

Related U.S. Application Data (60) Provisional application No. 63/058,317, filed on Jul. 29, 2020.

(51) Int. Cl.
*G06V 10/25*     (2022.01)
*G06T 7/55*      (2017.01)
(Continued)

(52) U.S. Cl.
CPC .................. *G06T 7/74* (2017.01); *G06T 7/55* (2017.01); *G06V 10/25* (2022.01); *G06V 20/56* (2022.01); *G06T 2207/30252* (2013.01)

(58) Field of Classification Search
CPC .. G06T 7/55; G06T 7/74; G06V 10/25; G06V 20/56
See application file for complete search history.

(56) References Cited

U.S. PATENT DOCUMENTS

| | | |
|---|---|---|
| 2015/0138340 A1 | 5/2015 | Lavoie |
| 2017/0177973 A1 | 6/2017 | Hu |
| 2019/0297233 A1 | 9/2019 | Gali |

FOREIGN PATENT DOCUMENTS

| | | |
|---|---|---|
| DE | 102011104256 A1 | 7/2012 |
| JP | 2020113268 A | 7/2020 |
| JP | 2021522504 A | 8/2021 |

OTHER PUBLICATIONS

The International Search Report and the Written Opinion of the International Searching Authority mailed on Nov. 5, 2021 for the counterpart PCT Application No. PCT/US2021/071051.
(Continued)

*Primary Examiner* — Sam Bhattacharya (57) ABSTRACT

A method for visual trailer tracking of vehicle-trailer angle estimation, including: (a) camera receiving images, each most recently received image being identified as a current image, replacing a previously identified current image; (b) during a driving maneuver, extracting visual features from the current image, calculating a trailer angle from the current image, and storing the current image as a reference image, the trailer angle as a trailer angle reference and the extracted visual features as visual reference features; and (c) matching the visual features from the current image with the visual reference features. When a number of matches is below a threshold, repeating operation (c) to update the reference
(Continued)

image, the trailer angle reference and the visual reference features. The method includes calculating a trailer angle between a trailer representation in the current image and a trailer representation in the reference image based in part upon the trailer angle reference.

13 Claims, 6 Drawing Sheets

(51) Int. Cl.
     *G06T 7/73*      (2017.01)
     *G06V 20/56*     (2022.01)

(56)          References Cited

OTHER PUBLICATIONS

Notice of Reasons for Refusal drafted on Mar. 22, 2024 for the counterpart Japanese Patent Application No. 2023-505930 and machine translation of same.
Notice of Reasons for Refusal drafted on Dec. 16, 2024 for the counterpart Japanese Patent Application No. 2023-505930 and machine translation of same.

LONG-TERM VISUAL TRAILER TRACKER FOR VEHICLE-TRAILER ANGLE ESTIMATION

CROSS REFERENCE TO RELATED APPLICATION

The present application is a National Stage Application under 35 U.S.C. § 371 of International Patent Application PCT/US2021/071051, filed on Jul. 29, 2021, and claims priority from US provisional patent application no. 63/058,317, filed Jul. 29, 2020, both applications of which are incorporated by reference herein.

TECHNICAL FIELD

This disclosure relates to a system and method for long-term visual trailer tracker for vehicle-trailer angle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used.

Some of the challenges that face tow vehicle drivers is performing tow vehicle maneuvers while the trailer is attached to the tow vehicle. In some examples, more than one person may be needed to maneuver the tow vehicle towards the specific location. Since the vehicle-trailer unit swivels around the hitch horizontally allowing the vehicle-trailer unit to move around corners, when the vehicle moves, it pushed/pulls the trailer. Drivers are often confused as to which way to turn the vehicle steering wheel to get the desired change of direction of the trailer when backing up, for example. Applying an incorrect steering angle in the vehicle may also cause the trailer to jack-knife and lose its course. Some tow vehicles include a jack-knife detection function in which the tow vehicle detects the angle of the trailer relative to the tow vehicle surpassing a predetermined angle when travelling in reverse, and alerts the vehicle driver or autonomously maneuvers the tow vehicle in response so as to avoid a jack-knife situation from occurring.

Therefore, it is desirable to provide a system that overcomes the challenges faced by drivers of tow vehicles attached to a trailer.

SUMMARY

According to one or more example embodiments, there is disclosed a method for visual trailer tracking for vehicle-trailer angle estimation. The method includes (a) receiving, by data processing hardware, images from a camera positioned on a rear portion of the tow vehicle facing a trailer connected to the tow vehicle, each most recently received image being identified as a current image, replacing a previously identified current image; and (b) during a driving maneuver extracting, by the data processing hardware, visual features of a representation of the trailer from the current image, calculating, by the data processing hardware, a trailer angle of the trailer relative to the tow vehicle from the current image and storing in memory coupled to the data processing hardware the current image as a reference image, the trailer angle as a trailer angle reference and the extracted visual features as visual reference features. Subsequent to (b) and after identifying, by the data processing hardware, a recently received image as the current image, the method includes (c) extracting, by the data processing hardware, visual reference features of a representation of the trailer from the current image and matching, by the data processing hardware, the visual features from the current image with the visual reference features of the reference image. When the matching is below a first predetermined threshold, the method includes (d) repeating (c) by the data processing hardware to update the reference image, the trailer angle reference and the visual reference features. The method further includes (e) calculating, by the data processing hardware, a trailer angle between the trailer representation in the current image and the trailer representation in the reference image based in part upon the trailer angle reference. The method includes (f) sending, by the data processing hardware, the calculated trailer angle to one or more vehicle systems.

The method may include, prior to (b), receiving or determining, by the data processing hardware, a bounding box, wherein extracting the visual features of the trailer representation in (b) includes extracting the visual features within the bounding box of the current image, and the method further includes updating, by the data processing hardware, the bounding box to contain the matched visual features.

Prior to (b), during a zero angle maneuver as the tow vehicle and trailer move in a largely straight path, the method includes determining, at the data processing hardware, visual features of the trailer representation from the images received during the zero angle maneuver and storing in the memory the visual features as zero angle reference features. The method further includes extracting, by the data processing hardware, visual features of the trailer representation from the current image, comparing the extracted visual features of the current image with the zero angle reference features, and when a distance between the comparison is below a second predetermined threshold, setting the trailer angle reference to zero and the trailer angle to zero.

In one implementation, matching the visual features from the current image with the visual reference features includes performing a correlation, a Brute-Force matcher or a Fast Library for Approximate Nearest Neighbors (FLANN) based matcher on the visual features from the current image with the visual reference features.

In one implementation, calculating the trailer angle in operation (e) is based in part upon a depth of the visual features of the trailer representation in the current image and the visual reference features.

According to an example embodiment, a system for visual trailer tracking of vehicle-trailer angle estimation is disclosed, including data processing hardware; and memory hardware in communication with the data processing hardware. The memory hardware stores instructions that when executed on the data processing hardware cause the data processing hardware to perform operations forming a method as described above. The system includes a camera positioned on the rear portion of the tow vehicle, the camera being communicatively coupled to the data processing hardware.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a vehicle coupler attached to a trailer hitch, e.g., a vehicle tow ball attached to a trailer hitch coupler. It is desirable for a tow vehicle to include a long-term visual trailer tracking system configured to track the trailer attached to the tow vehicle.

Figure 1A:
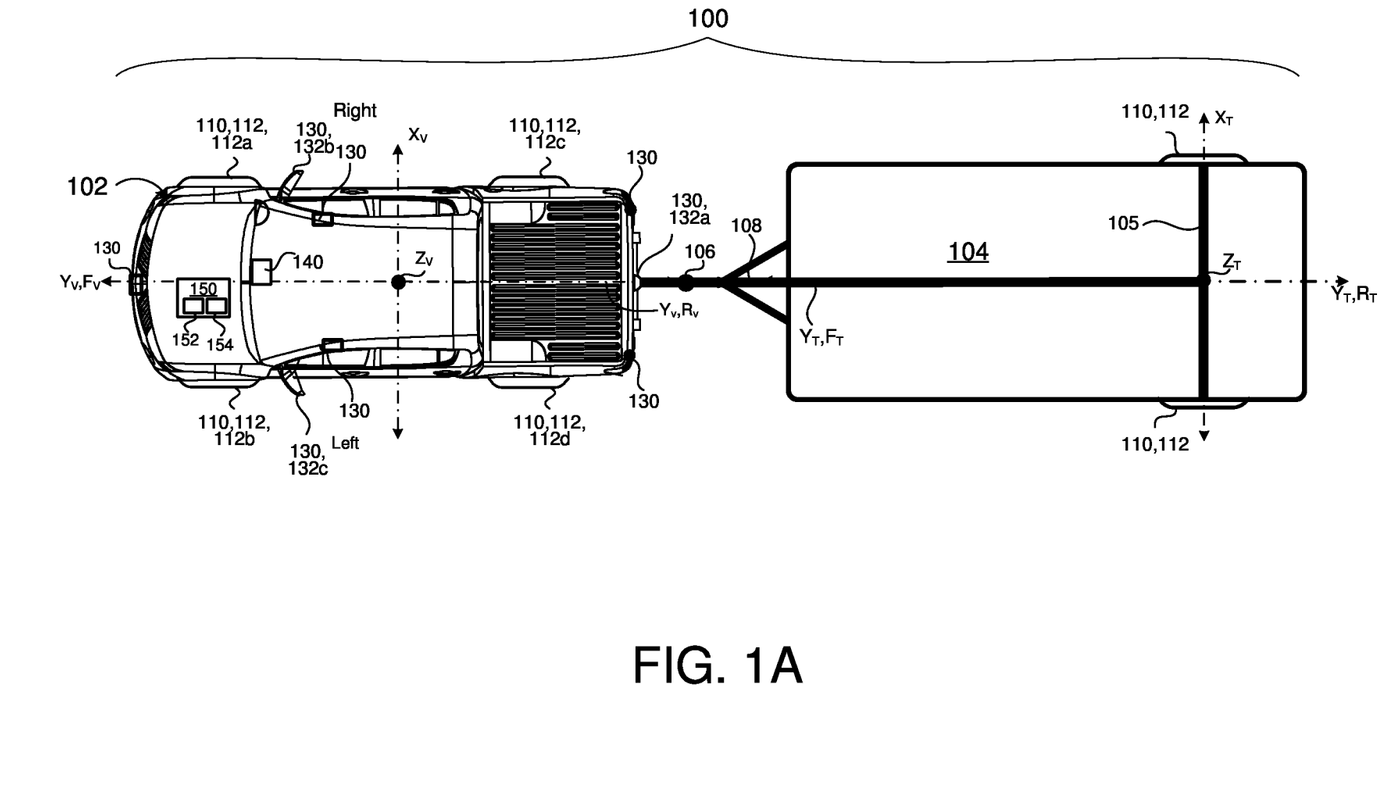
FIG. 1A is a schematic view of an exemplary tow vehicle hitched to a trailer.
Figure 1B:
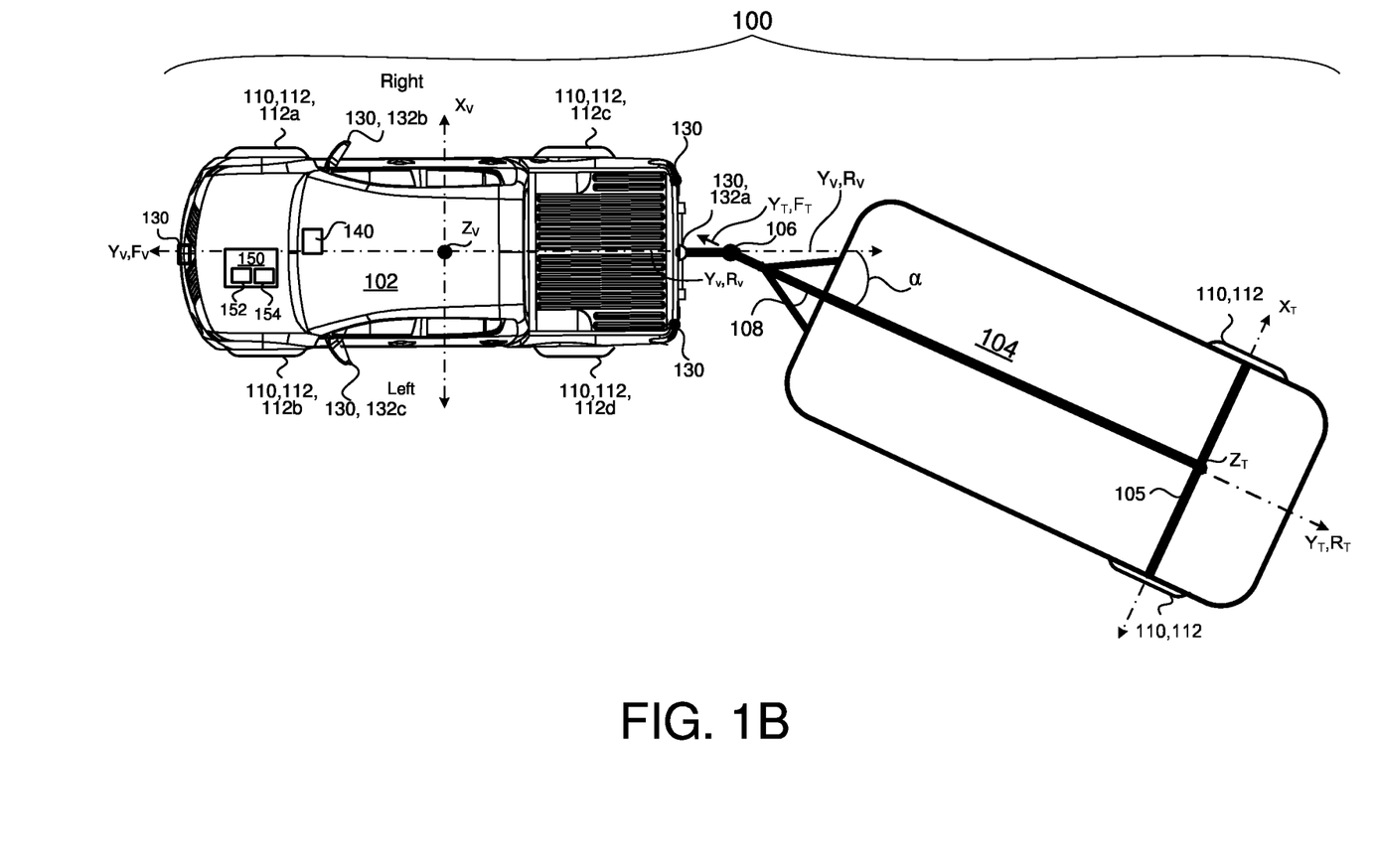
FIG. 1B is a schematic view of an exemplary tow vehicle hitched to a trailer at an angle.
Figure 2:
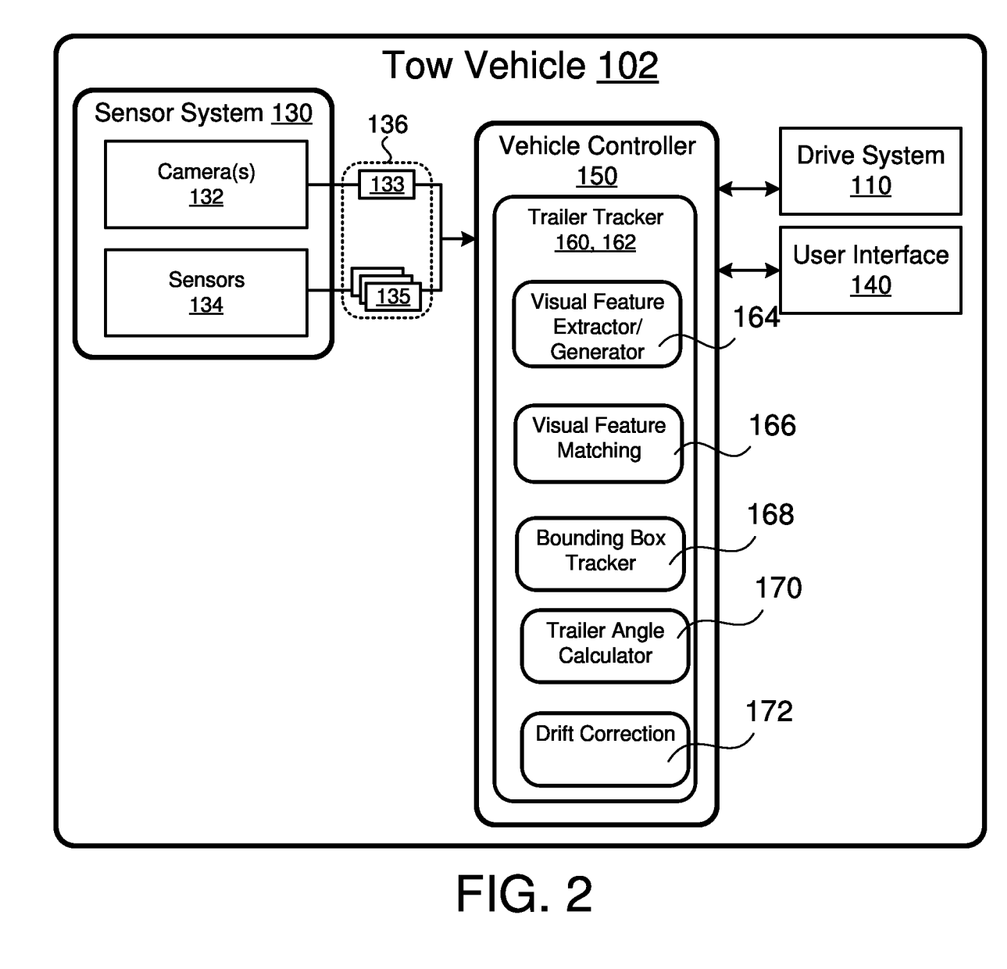
FIG. 2 is a schematic view of the exemplary tow vehicle having an angle detection system, according to an example embodiment.

Referring to FIGS. 1A-2, in some implementations, a vehicle-trailer system 100 includes a tow vehicle 102 hitched to a trailer 104. The tow vehicle includes a vehicle tow ball attached to a trailer hitch coupler 106 supported by a trailer hitch bar 108 of the trailer 104. The tow vehicle 102 includes a drive system 110 associated with the tow vehicle 102 that maneuvers the tow vehicle 102 and thus the vehicle-trailer system 100 across a road surface based on drive maneuvers or commands having x, y, and z components, for example. The drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 may include a motor or an engine that converts one form of energy into mechanical energy allowing the vehicle 102 to move. The drive system 110 includes other components (not shown) that are in communication with and connected to the wheels 112 and engine and that allow the vehicle 102 to move, thus moving the trailer 104 as well. The drive system 110 may also include a brake system (not shown) that includes brakes associated with each wheel 112, 112a-d, where each brake is associated with a wheel 112a-d and is configured to slow down or stop the wheel 112a-n from rotating. In some examples, the brake system is connected to one or more brakes supported by the trailer 104. The drive system 110 may also include an acceleration system (not shown) that is configured to adjust a speed of the tow vehicle 102 and thus the vehicle-trailer system 100, and a steering system (not shown) that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along. While turning, the tow vehicle 102 and the trailer 104 form a trailer angle α.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side and a left side of the trailer 104 along a trailer turning axle 105. In some examples, the trailer 104 includes a front axle (not shown) and rear axle 105. In this case, the trailer transverse axis $X_T$ extends between a right side and a left side of the trailer 104 along a midpoint of the front and rear axle (i.e., a virtual turning axle). A forward drive direction along the trailer fore-aft axis $Y_T$ is designated as FT, also referred to as a forward motion. In addition, a trailer aft or rearward drive direction along the fore-aft direction $Y_T$ is designated as RT, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form the trailer angle α being an angle between the vehicle fore-aft axis $Y_V$ and the trailer fore-aft axis $Y_T$.

The vehicle 102 includes a sensor system 130 to provide sensor system data 136 that may be used to determine one or more measurements, such as a trailer angle α. In some examples, the vehicle 102 may be autonomous or semi-autonomous, therefore, the sensor system 130 provides sensor data 136 for reliable and robust autonomous driving. The sensor system 130 provides sensor system data 136 and may include different types of sensors that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 130. In some examples, the sensor system 130 includes one or more sensors 132 supported by a rear portion of the tow vehicle 102 which provide sensor system data 136 associated with object(s) positioned behind the tow vehicle 102. The tow vehicle 102 may support the sensor system 130; while in other examples, the sensor system 130 is supported by the vehicle 102 and the trailer 104.

The sensor system 130 includes one or more cameras 132a-132c that provide camera data 133. The one or more cameras 132a-132c may include mono-cameras where each position on an image shows a different amount of light, but not a different hue. In some examples, the camera(s) 132a-

132c may include a fisheye lens that includes an ultra wide-angle lens that produces strong visual distortion intended to create a wide panoramic or hemispherical image 133. Fisheye cameras capture images 133 having an extremely wide angle of view. Other types of cameras may also be used to capture images 133 of the vehicle and trailer environment. The camera data 133 may include additional data 133 such as intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 133 may include minimum/maximum/average height of the camera 132a-1332c with respect to ground (e.g., when the vehicle is loaded and unloaded), and a longitudinal distance between the camera 132a-132c and the tow vehicle hitch ball.

The sensor system 130 may include, but is not limited to, radar, sonar, LIDAR (Light Detection and Ranging, which can entail optical remote sensing that measures properties of scattered light to find range and/or other information of a distant target), LADAR (Laser Detection and Ranging), ultrasonic, etc. The sensor system 130 provides sensor system data 136 that includes one or both of images 133 from the one or more cameras 132a-132c and sensor information 135 from the one or more other sensors. Therefore, the sensor system 130 is especially useful for receiving information of the environment or portion of the environment of the vehicle and for increasing safety in the vehicle-trailer system 100 which may operate by the driver or under semi-autonomous or autonomous conditions. In some implementations, a first camera 132b and a second camera 132c are positioned on each side of the vehicle 102. Additionally, a rear facing third camera 132c may be mounted at the rear of the vehicle 102, such as along the tailgate or with the center high mount stop light (CHMSL) if the tow vehicle 102 is a pickup truck.

The tow vehicle 102 may include a user interface 140, such as a display. The user interface 140 is configured to display information to the driver. In some examples, the user interface 140 is configured to receive one or more user commands from the driver via one or more input mechanisms or a touch screen display and/or displays one or more notifications to the driver. In some examples, the user interface 140 is a touch screen display. In other examples, the user interface 140 is not a touchscreen and the driver may use an input device, such as, but not limited to, a rotary knob or a mouse to make a selection. In some examples, a trailer parameter detection system 160 instructs the user interface 140 to display one or more trailer parameters 162.

The user interface 140 is in communication with a vehicle controller 150 that includes a computing device (or data processing hardware) 152 (e.g., central processing unit having one or more computing processors) in communication with non-transitory memory and/or memory hardware 154 (e.g., a hard disk, flash memory, random-access memory) capable of storing instructions executable on the computing processor(s)). In some example, the non-transitory memory 154 stores instructions that when executed on the data processing hardware 152 cause the vehicle controller 150 to send a signal to one or more other vehicle systems. As shown, the vehicle controller 150 is supported by the tow vehicle 102; however, the vehicle controller 150 may be separate from the tow vehicle 102 and in communication with the tow vehicle 102 via a network (not shown). In addition, the vehicle controller 150 is in communication with the sensor system 130 and receives sensor system data 136 from the sensor system 130. In some examples, the vehicle controller 150 is configured to process sensor system data 136 received from the sensor system 130.

In some implementations, the vehicle controller 150 executes a trailer tracking system 160 that is configured to track the trailer 102 that is attached to the tow vehicle 102 using only a single monocular camera 132a. The tracking system 160 may be part of and/or used with, for example, a trailer reverse assist system of the tow vehicle 102 which, among other things, executes a jack-knife detection function. The tracking algorithm 162 of the trailer tracking system 160 is configured to track the trailer 104 for long periods of time (e.g., during all parking maneuvers with several turns). The tracking system 160 also calculates the trailer angle α of the vehicle-trailer system even when the trailer 104 is partially hidden from the vehicle camera. The calculated trailer angle α may be used in a jack-knife detection operation when the tow vehicle 102 and the trailer 104 are travelling in reverse.

The tracking algorithm 162 corrects the accumulated drift over time by using a zero-reference obtained at a calibration maneuver. To improve the robustness of the algorithm 162, the algorithm may use other vehicle information such as vehicle steering wheel angle, wheel ticks, vehicle velocity, gear, and/or IMU information received from other sensors 134. The trailer tracking system 160 may still function even if the body of the trailer 104 is partially or completely hidden from the camera 132a. If the body is partially hidden, the algorithm 162 estimates high-angles from the vehicle-trailer system. An advantage is that the algorithm 162 does not require the use of deep learning or algorithms with high complexity that needs high-end CPUs or GPUs.

The trailer tracking system 160 visually tracks the trailer 104 attached to the tow vehicle 102 using only the rear monocular camera 132a.

The trailer tracking system 160 and/or the tracking algorithm 162 thereof includes a number of modules for use in performing the trailer tracking and trailer angle calculation. Referring to FIG. 2, the tracking algorithm 162 includes a visual feature extractor 164 which extracts visual features from images 133 captured by the camera 132. In one implementation, the extracted visual features are visual features of a representation of the trailer 104 in each of the images 133. The visual features and/or visual feature descriptors extracted may include, for example, a histogram of gradients (HOG), or oriented FAST and rotated BRIEF (ORB). These visual features and/or feature descriptors (hereinafter "visual features") are extracted using known computer vision methods. The extracted visual features are maintained in the memory 154 of the vehicle controller 150.

The trailer tracking algorithm further includes a visual feature matching module 166 which matches the visual features of two images, such as a current image and a reference image captured by the rear-facing camera 132a. The visual feature matching algorithm 166 may utilize any of a number of visual feature matching approaches, such as a convolution technique, a Brute-Force matcher, or a Fast Library for Approximate Nearest Neighbors (FLANN) based matcher. In one implementation, the visual features to be matched are visual features which are within a bounding box that surrounds the representation of the trailer 104 in a corresponding captured image.

The trailer tracking algorithm 162 further includes a bounding box tracker module 168 which, in one implementation, tracks a representation of the trailer 104 in an image 133 and generates a bounding box surrounding the tracked trailer representation. The generated bounding box may be used in extracting and matching visual features in captured images, as described herein.

In addition, the trailer tracking algorithm 162 includes a trailer angle calculator module 170 which calculates the trailer angle α between two images. In one implementation, the trailer angle calculator 170 calculates the relative angle between a current image and a reference image. The trailer angle may be calculated, for example, based in part upon the depth of the extracted visual features of an image being known. The trailer angle calculator module 170 may use a single point based on an estimation of the feature depth and other parameters captured in a calibration phase.

The trailer tracking algorithm 162 further includes a drift correction module 172 which compares and/or matches visual features of two different images, such as the current image and an image taken during a zero angle maneuver. The matching/comparing may include a convolution operation, a Brute-Force matcher, or a FLANN based matcher, for example.

Figure 5:
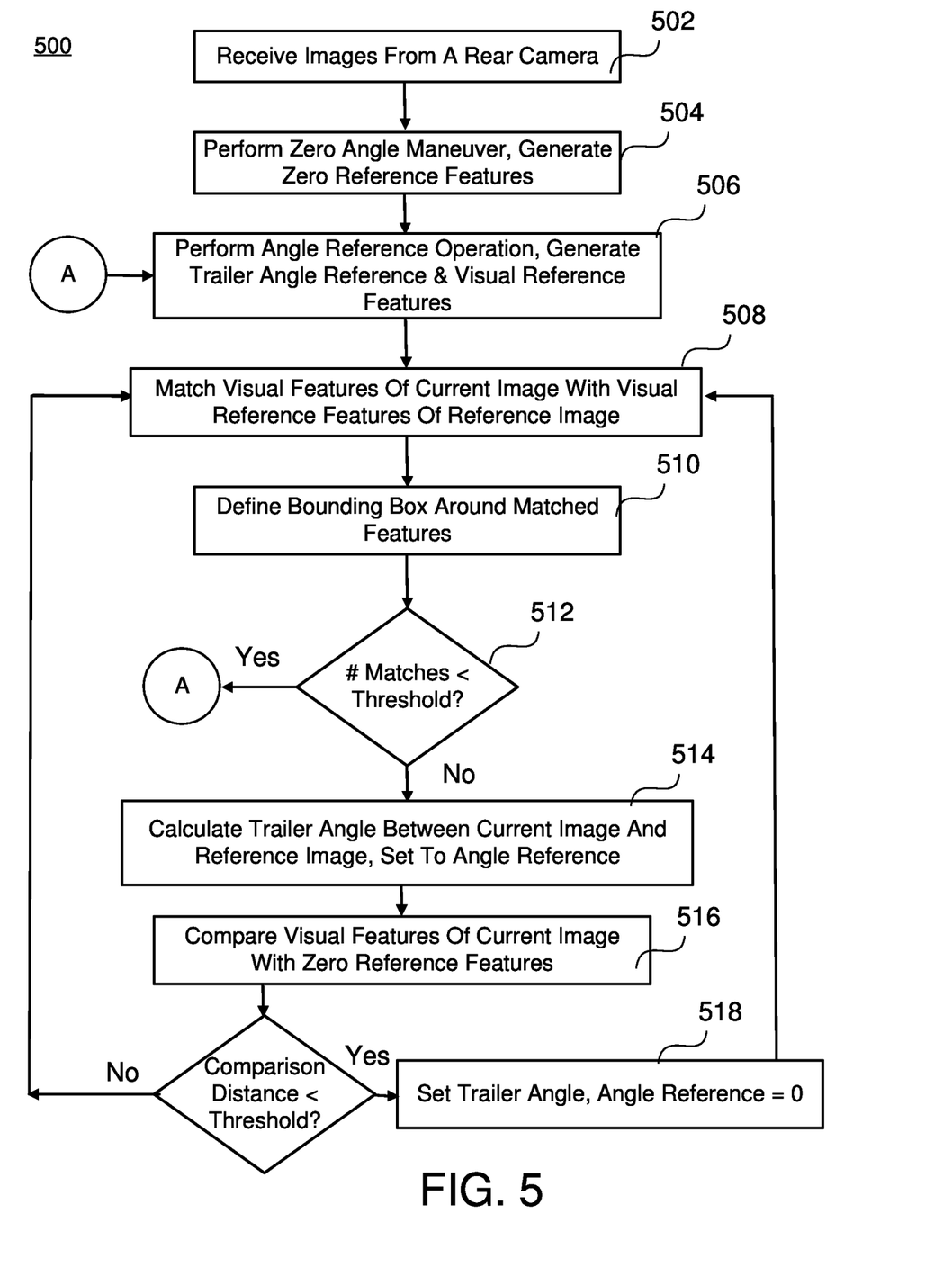
FIG. 5 is a flowchart illustrating a method of vehicle-trailer angle estimation using long-term visual trailer tracking, according to an example embodiment.

A method 500 for visual trailer tracking and trailer angle calculating will be described with reference to FIG. 5. Images captured by the rear camera 132a are provided to the data processing hardware 152 at 502. A trailer angle reference value is set to zero. At 504, a zero angle maneuver is performed in which the system determines a zero reference value by driving the tow vehicle 102 with connected trailer 104 in a straight line and/or along a straight path until the fore-aft axis $Y_V$ of tow vehicle 102 and the fore-after axis $Y_T$ of the trailer 104 are aligned (i.e., have a zero angle between them). When the tow vehicle 102 and the trailer 104 are aligned, the data processing hardware 152 determines or otherwise extracts visual reference features of a representation of the trailer 104 appearing in the captured images 133, with outliers being filtered out. This block 504 may include using the visual feature extractor module 164. In addition, vehicle information such as steering wheel angle, wheel ticks, vehicle velocity and acceleration may be used to increase the robustness of the extraction of visual features. The extracted visual features and/or descriptors are saved in the memory 154 as zero reference visual features.

At some point within the initial portion of the method 500 before, during and/or following the zero angle maneuver, the data processing hardware 152 receives, obtains or determines an initial bounding box from the current image (i.e., the most recently captured image received by the data processing hardware 152). In one aspect, the bounding box may be defined by a user by using the user interface 140 to draw a bounding box about a representation of the trailer 104 in the current image. In another aspect, the initial bounding box may be determined by the data processing hardware 152.

Following the zero angle maneuver, and as the data processing hardware 152 continues to receive images captured by the rear camera 132a, the method 500 further includes performing at 506 a trailer angle reference operation in which visual features of the representation of the trailer 104 are extracted from the current image. The extracted visual features are extracted from the region within the bounding box applied to the current image. This extraction may use the visual feature extractor module 164. The current image is stored as a reference image and these extracted visual features are stored as visual reference features. In addition, a trailer angle α may be determined from the current image and stored as a trailer angle reference.

The method further includes matching at 508 the extracted visual features of the trailer representation in the current image with the extracted visual features of the trailer representation in the reference image from block 506, using the visual feature matching module 166. The matching may include, for example, a convolution function, a Brute-Force matcher, or a FLANN based matcher in performing the matching. It is understood that other techniques for matching or comparing may be used in addition or in the alternative.

Figure 3:
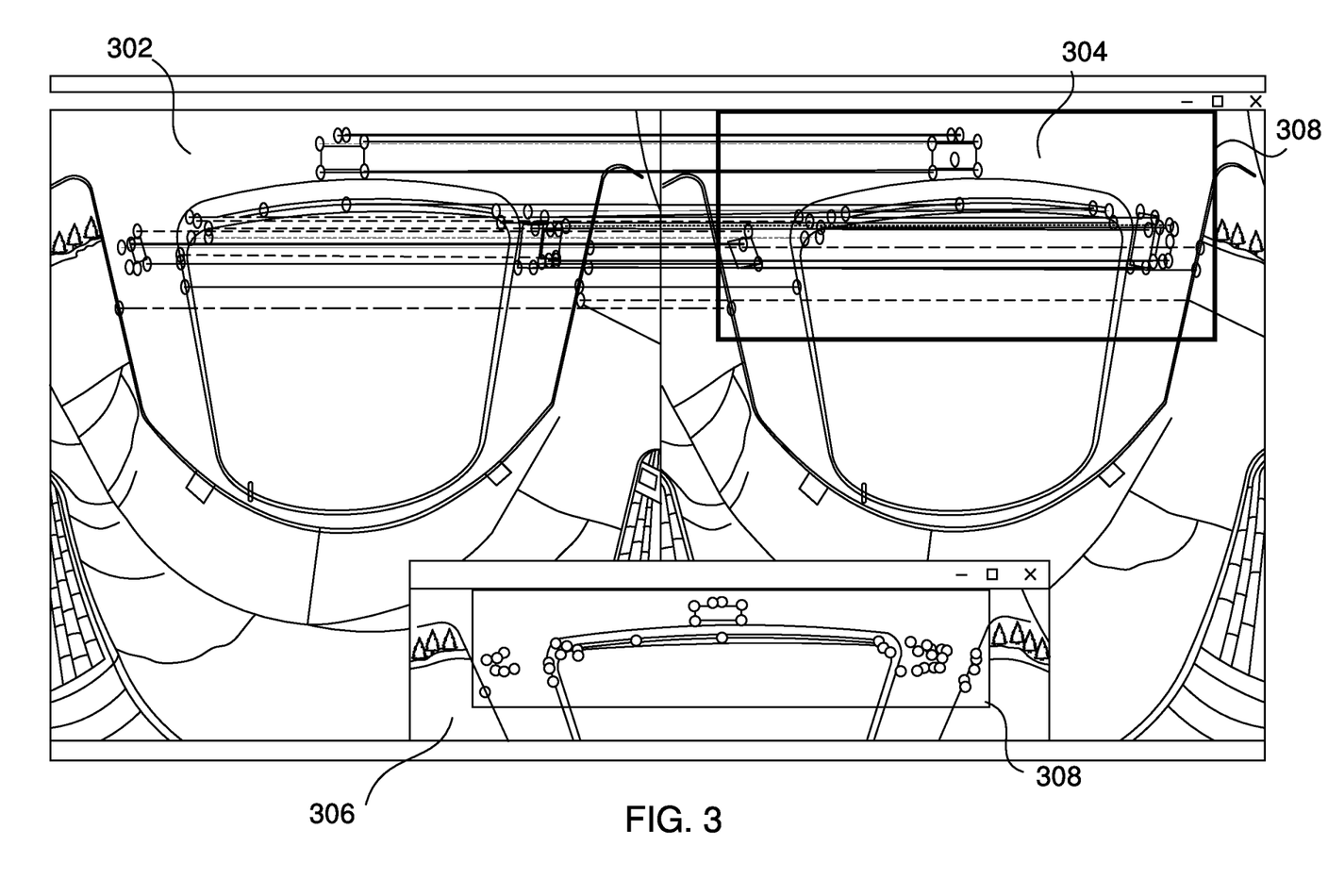
FIGS. 3 and 4 are examples of matching visual features appearing in captured images by the camera, according to an example embodiment.

FIG. 3 illustrates the results of the matching operation of 508 in which a relatively large number or percentage of the extracted visual features are successfully matched. The image 302 in the left portion of the drawing is a reference image and the image 304 in the right portion of the drawing is the current image. The image in the lower central portion of the drawing illustrate the matched reference features. The matched reference features from the reference image and the current image are also identified by line segments disposed therebetween. In addition, a current bounding box 308 is generated at 510 and shown in the images 304 and 306 which surround the matched visual features.

Figure 4:
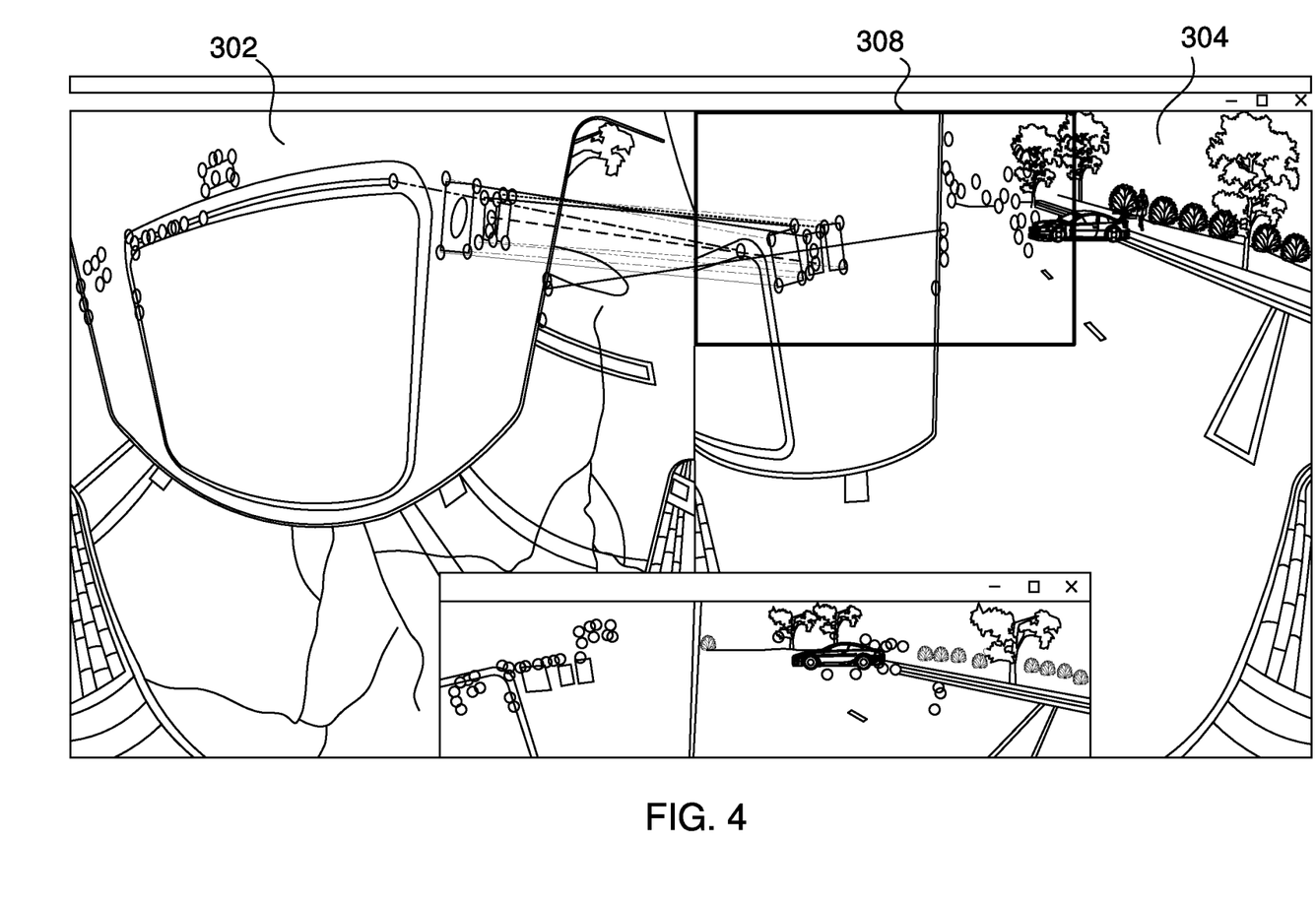

FIG. 4 illustrates the results of the matching operation of 508 in which a lesser number or percentage of the extracted visual features are matched due to the current image 304 only showing a portion of the trailer representation. As can be seen, only the extracted visual features appearing on the right portion of the trailer representation are matched between the reference image 302 and the current image 304.

Referring again to FIG. 5, if the number or percentage of visual features that were successfully matched between the reference image and the current image is less than a predetermined threshold value at 512, indicating a low level or low quality of matched visual features, the data processing hardware 152 returns to block 506 to determine a new reference image and corresponding visual reference features, using the visual feature extractor module 164. Generating a new reference image and corresponding extracted visual reference features may be necessary if, for example, the lighting had changed, such as more or less shading, thereby making higher quality matching of extracted visual features less likely to occur. Further, the matching illustrated in FIG. 4 may result in the data processing hardware 152 returning to block 506 to generate a new reference image, corresponding extracted visual features and a trailer angle reference value.

If the number and/or percentage of matched extracted visual features of the trailer representation exceed the predetermined threshold, the data processing hardware 152 calculates at 514 the trailer angle α between the current image and the reference image, via use of the trailer angle calculator module 170. The trailer angle α is the sum of the trailer angle calculated in this block and the trailer reference angle determined in block 506.

The data processing hardware 152 performs a drift correction operation in part by comparing at 516 the extracted visual features of the current image (determined in this block using the visual feature extractor module 164) with the visual features that were stored during the zero angle maneuver in block 504. When the distance corresponding to this comparison is below a second predetermined threshold, thereby indicating a zero trailer angle crossing in which the trailer 104 is positioned at a zero trailer angle, the current trailer angle α and the trailer angle reference value are each set to zero at 518. After completing block 518, the method returns to block 508. Blocks 516 and 518 serve to correct for drift of the zero angle reference over time. The current trailer angle α may be sent to one or more other vehicle systems, such as a trailer reverse assist system of the tow vehicle 102 for use in preventing a trailer jack-knife event from occurring.

If the distance is greater than the second predetermined threshold, the method returns to block 508 without performing block 518.

The trailer tracking algorithm 162 receives the following inputs: a) images from a rearward-facing monocular camera 132a; b) an initial bounding box containing a representation of the trailer in an image; and c) optionally vehicle information such as steering wheel angle, wheel encoders, gear, IMU, etc. The trailer tracking algorithm 162 outputs: a) a bounding box tracking the face of the trailer 104 in the current image; and b) the trailer angle α of vehicle-trailer system.

As previously mentioned, additional data 133 such as intrinsic parameters associated with the rear camera 132 (e.g., focal length, image sensor format, and principal point) are known.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, model-based design with auto-code generation, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for visual trailer tracking for vehicle-trailer angle estimation, the method comprising:
   (a) receiving, by data processing hardware, images from a camera positioned on a rear portion of the tow vehicle facing a trailer connected to the tow vehicle, each most recently received image being identified as a current image, replacing a previously identified current image;
   (b) during a driving maneuver extracting, by the data processing hardware, visual features of a representation of the trailer from the current image, calculating, by the data processing hardware, a trailer angle of the trailer relative to the tow vehicle from the current image and storing in memory coupled to the data processing hardware the current image as a reference image, the trailer angle as a trailer angle reference and the extracted visual features as visual reference features;
   (c) subsequent to (b) and after identifying, by the data processing hardware, a recently received image as the current image, extracting, by the data processing hardware, visual reference features of a representation of the trailer from the current image and matching, by the data processing hardware, the visual features from the current image with the visual reference features of the reference image;
   (d) when the matching is below a first predetermined threshold, repeating (c) by the data processing hardware to update the reference image, the trailer angle reference and the visual reference features;
   (e) calculating, by the data processing hardware, a trailer angle between the trailer representation in the current image and the trailer representation in the reference image based in part upon the trailer angle reference; and
   (f) sending, from the data processing hardware to one or more vehicle systems, the calculated trailer angle.

2. The method of claim 1, further comprising prior to (b), receiving or determining, by the data processing hardware, a bounding box, wherein extracting the visual features of the trailer representation in (b) comprises extracting the visual features within the bounding box of the current image, and the method further comprises updating, by the data processing hardware, the bounding box to contain the matched visual features.

3. The method of claim 1, further comprising:
prior to (b), during a zero angle maneuver as the tow vehicle and trailer move in a largely straight path, determining, at the data processing hardware, visual features of the trailer representation from the images received during the zero angle maneuver and storing in the memory the visual features as zero angle reference features.

4. The method of claim 3, further comprising extracting, by the data processing hardware, visual features of the trailer representation from the current image, comparing the extracted visual features of the current image with the zero angle reference features, and when a distance between the comparison is below a second predetermined threshold, setting the trailer angle reference to zero and the trailer angle to zero.

5. The method of claim 1, wherein matching the visual features from the current image with the visual reference features comprises performing a correlation, a Brute-Force matcher or a FLANN based matcher on the visual features from the current image with the visual reference features.

6. The method of claim 1, wherein calculating the trailer angle in operation (e) is based in part upon a depth of the visual features of the trailer representation in the current image and the visual reference features.

7. The system of claim 6, wherein the operations further comprise prior to (b), receiving or determining a bounding box, wherein extracting the visual features of the trailer representation in (b) comprising extracting the visual features within the bounding box of the current image, and the method further comprises updating the bounding box to contain the matched visual features.

8. The system of claim 6, wherein the operations further comprise:
prior to (b), during a zero angle maneuver as the tow vehicle and trailer move in a largely straight path, determining, at the data processing hardware, visual features of the trailer representation from the images received during the zero angle maneuver and storing in the memory hardware the visual features as zero angle reference features.

9. The system of claim 8, wherein the operations further comprise extracting visual features of the trailer representation from the current image, comparing the extracted visual features of the current image with the zero angle reference features, and when a distance between the comparison is below a second predetermined threshold, setting the trailer angle reference to zero and the trailer angle to zero.

10. A system for visual trailer tracking of vehicle-trailer angle estimation, the system comprising:
data processing hardware; and
memory hardware in communication with the data processing hardware, the memory hardware storing instructions that when executed on the data processing hardware cause the data processing hardware to perform operations comprising:
(a) receiving images from a camera positioned on a rear portion of the tow vehicle facing a trailer connected to the tow vehicle, each most recently received image being identified as a current image, replacing a previously identified current image;
(b) during a driving maneuver extracting visual features of a representation of the trailer from the current image, calculating a trailer angle of the trailer relative to the tow vehicle from the current image and storing in the memory hardware coupled to the data processing hardware the current image as a reference image, the trailer angle as a trailer angle reference and the extracted visual features as visual reference features;
(c) subsequent to (b) and after identifying a recently received image as the current image, extracting visual reference features of a representation of the trailer from the current image and matching the visual features from the current image with the visual reference features of the reference image;
(d) when the matching is below a first predetermined threshold, repeating, (c) by the data processing hardware to update the reference image, the trailer angle reference and the visual reference features;
(e) calculating a trailer angle between the trailer representation in the current image and the trailer representation in the reference image based in part upon the trailer angle reference; and
(f) sending, from the data processing hardware to one or more vehicle systems, the calculated trailer angle.

11. The system of claim 10, wherein matching the visual features from the current image with the visual reference features comprises performing a correlation, a Brute-Force matcher, or a FLANN based matcher on the visual features from the current image with the visual reference features.

12. The system of claim 10, wherein calculating the trailer angle in operation (e) is based in part upon a depth of the visual features of the trailer representation in the current image and the visual reference features.

13. The system of claim 10, further comprising the camera positioned on the rear portion of the tow vehicle, the camera being communicatively coupled to the data processing hardware.

* * * * *